US012326014B2

(12) United States Patent
Zabala Zabaleta et al.

(10) Patent No.: US 12,326,014 B2
(45) Date of Patent: Jun. 10, 2025

(54) LOCK IDENTIFIER ASSEMBLY

(71) Applicant: OJMAR, S.A., Elgoibar (ES)

(72) Inventors: Jon Zabala Zabaleta, Elgoibar (ES); Joseba Jokin Aguirrezabala Olasagasti, Elgoibar (ES)

(73) Assignee: OJMAR, S.A., Elgoibar (ES)

( * ) Notice: Subject to any disclaimer, the term of this patent is extended or adjusted under 35 U.S.C. 154(b) by 186 days.

(21) Appl. No.: 18/224,613

(22) Filed: Jul. 21, 2023

(65) Prior Publication Data

US 2024/0035305 A1 Feb. 1, 2024

(30) Foreign Application Priority Data

Jul. 28, 2022 (ES) ............................ ES202231259U

(51) Int. Cl.
*E05B 41/00* (2006.01)
*E05B 65/02* (2006.01)

(52) U.S. Cl.
CPC ............ *E05B 41/00* (2013.01); *E05B 65/025* (2013.01)

(58) Field of Classification Search
CPC ......... E05B 39/00; E05B 41/00; E05B 65/025
See application file for complete search history.

(56) References Cited

U.S. PATENT DOCUMENTS

| | | | | |
|---|---|---|---|---|
| 7,540,176 | B2 | 6/2009 | Arriola Arrizabalaga et al. | |
| 7,647,797 | B1 | 1/2010 | Viso Cabrera et al. | |
| 2020/0190856 | A1* | 6/2020 | Kaverina | E05B 41/00 |
| 2021/0230903 | A1* | 7/2021 | Fournier | E05B 17/226 |

FOREIGN PATENT DOCUMENTS

| | | | | |
|---|---|---|---|---|
| EP | 2141664 B1 * | 3/2012 | | E05B 47/0012 |
| ES | 2331500 B2 * | 8/2010 | | E05B 1/0038 |
| ES | 1289360 U | 4/2022 | | |
| WO | WO-2013105850 A1 * | 7/2013 | | E05B 1/0038 |

* cited by examiner

*Primary Examiner* — Kristina R Fulton
*Assistant Examiner* — Christopher F Callahan
(74) *Attorney, Agent, or Firm* — The Webb Law Firm

(57) ABSTRACT

The invention relates to a lock identifier assembly for locks with a cover with a main body, a hollow projection and a knob housed in the hollow projection and with a knob ramp. It includes a tongue, with a recess and a tongue ramp, linked to the knob ramp such that when the knob is actuated, the knob ramp moves, moving the tongue with it to lock/unlock the lock. There is an identification element housed in the hollow projection that has a guide element housed in the recess of the tongue and which is movable on the tongue ramp. When the tongue is moved by the knob, the identification element moves longitudinally in the hollow projection between a position in which it is hidden in said projection and a position in which it projects superiorly from an upper end of said hollow projection.

8 Claims, 3 Drawing Sheets

LOCK IDENTIFIER ASSEMBLY

CROSS-REFERENCE TO RELATED APPLICATION

This application claims priority to Spanish Patent Application No. U202231259 filed Jul. 28, 2022, the disclosure of which is hereby incorporated by reference in its entirety.

BACKGROUND OF THE INVENTION

Field of the Invention

The present invention relates to a lock identifier assembly, the configuration and design of which make it easier for the user to know if the lock is unlocked or locked.

Description of Related Art

Currently, in facilities where there are many lockers, it is often difficult visually to tell if the lockers are unlocked or locked.

Until users are close to the lockers, they do not know if they are free to be used or not, that is, if they are locked or unlocked. Sometimes users even have to try to open a locker door to see if it is free or in use.

There are systems on the market, such as electronic locks, in which the lock indicates the status of the door with a red or green light, but this involves battery consumption in the case of battery-powered locks or devices, and in many cases, when at a certain distance or at a certain viewing angle, the user cannot see the color or the light emitted by the lock.

Furthermore, displays such as those defined in document ES 1289360 U are often placed on the door, which provide a solution to the problems mentioned in this section. However, manufacturers often prefer not to use these displays because they affect the aesthetics of the door, given that they are an addition to the lock which occupy a certain space on the door.

SUMMARY OF THE INVENTION

The object of this description relates to a lock identifier assembly, the configuration and design of which make it easier for the user to know if the lock is unlocked or locked, maintaining the aesthetics of the door.

Therefore, the present invention solves all the aforementioned problems.

The lock identifier assembly of the present invention can be used on all currently known locks, regardless of whether they are electronic or merely mechanical. It is preferably used in locks of the type found in lockers.

Currently known locks comprise at least one cover, which is the element that is installed on the door to be locked, and a knob, which is the element that the user actuates when the lock is to be unlocked or locked. Likewise, the locks comprise a tongue, the movement of which causes the unlocking or locking of the lock and which is linked to the knob. When the user actuates the knob to lock a lock, the tongue moves, locking said lock. To unlock the lock, the user actuates the knob again, either manually or electronically, and the tongue moves in the opposite direction, unlocking the lock.

The identifier assembly of the present invention is integrated into the lock itself so it is not necessary to make an addition to the lock and therefore the aesthetics of the door are unaffected.

The identifier assembly comprises the tongue and comprises an identification element.

In the identifier assembly, the tongue, in addition to the elements by means of which it is linked to the knob, has at least one recess with at least one inclined surface.

Said inclined surface forms a tongue ramp.

Likewise, in the identifier assembly, the identification element is configured to be housed in a hollow projection of the cover and has, at a lower end, at least one guide element configured to be housed in the recess of the tongue and movable through said recess in the direction of the tongue ramp. When the tongue is moved to unlock the lock, the identification element moves in the longitudinal direction of the hollow projection to a first position in which it is hidden from the user, indicating that the lock is unlocked. When the tongue moves, actuated by the movement of the knob to lock the lock, the identification element moves in the longitudinal direction of the projection of the hole to a second position in which it projects superiorly from an upper end of said hollow projection, being visible to the user, thus indicating that the lock is locked.

When the lock is in the unlocked state, the identification element is in a first position, hidden inside the lock, whereas when the lock is in the locked state, the identification element is in a second position, which is a more external position in which it is displayed to the user.

In addition, both the knob and the identification element can comprise signaling sections, for example of different colors, so that the user can confirm even more quickly if the lock is unlocked or not.

When the tongue moves from the locked to the unlocked position, or from the unlocked to the locked position (actuated by the movement of the knob), the identifier moves in a transverse direction to the tongue, retracting into the cover such that it is hidden (first position) or becomes visible (second position).

In an embodiment, in push locks, the identification element includes a red colored identification element signaling section and the knob comprises a different colored knob signaling section, so that, when the lock is unlocked, it shows the knob section in a color other than red, indicating that the lock is unlocked.

In another embodiment, also in push locks, the identification element signaling section is red and the knob signaling section is two colors, one section green and the rest a color other than green and different from red. In this way, when the lock is unlocked the green stripe is visible, indicating to the user that it is unlocked, whereas when the lock is locked, the identifier hides the green stripe, showing only the color of the identification element signaling section, which is red.

BRIEF DESCRIPTION OF THE DRAWINGS

To complete the description, and for the purpose of helping to make the features of the invention more readily understandable, this description is accompanied by a set of drawings constituting an integral part of the same, which by way of illustration and not limitation represents the following.

Below, a list is provided of the different elements represented in the figures making up the invention:

1: tongue; 1A: tongue ramp; 1B: nipple; 2: cover; 2A: main body; 2B: hollow projection; 3: knob, 3A: knob ramp; 3B: knob signaling section, 4: identification element; 4A: guide element; 4B: identification element signaling section

DESCRIPTION OF THE INVENTION

Figure 1:
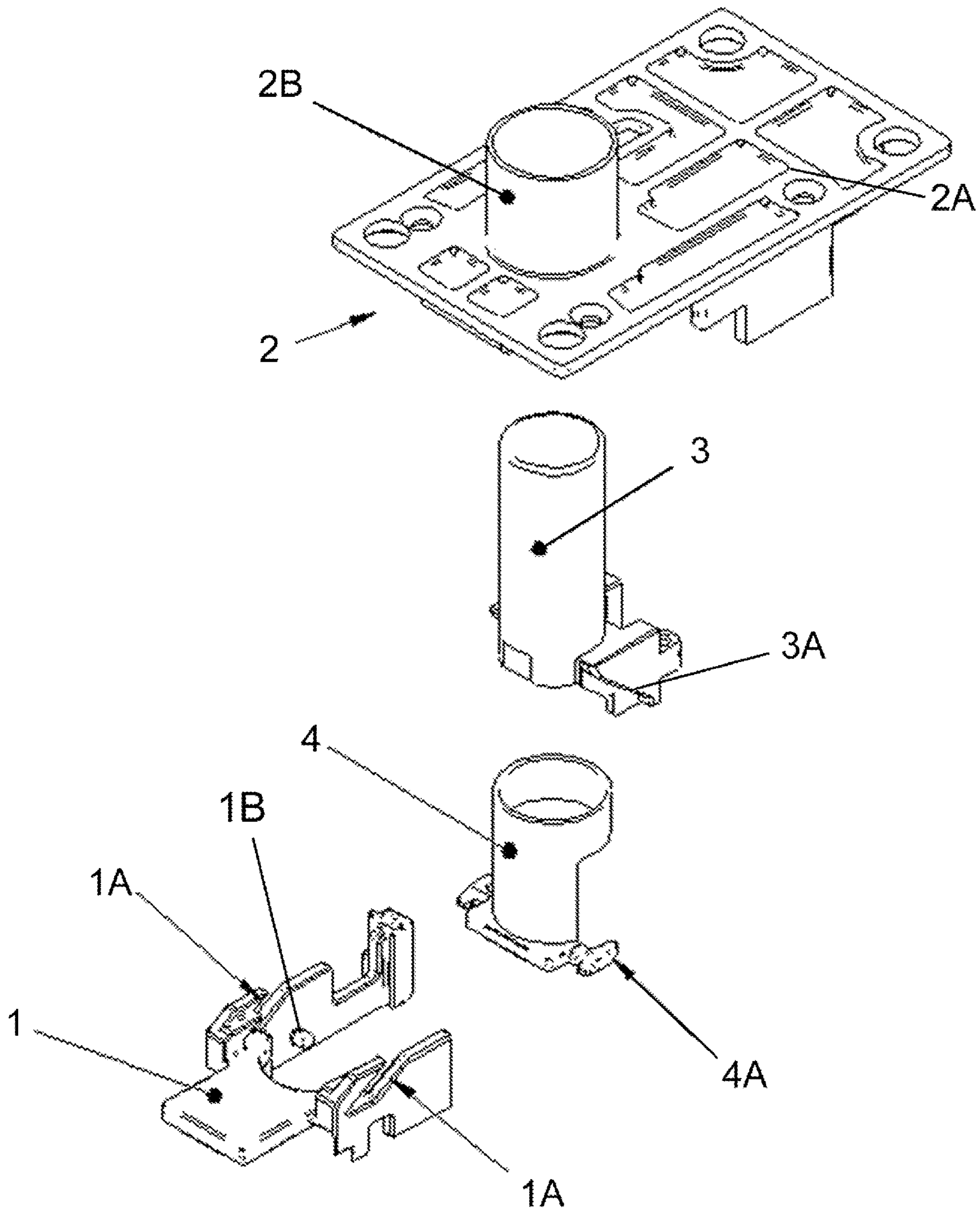
FIG. 1 shows an exploded view of the lock identifier assembly.

The lock identifier assembly of the invention is shown in an exploded view in FIG. 1. The purpose of this identifier assembly is to make it easier for the user to know if the lock is unlocked or locked.

Thus, the identifier assembly of the present invention allows the user, with a simple glance, to determine if the lock is unlocked or locked and is valid for both automatic and manual mechatronic locks, as well as mechanical locks.

The assembly is configured to be used in a lock of the type that includes a cover (2) with a main body (2A), configured to be installed in a door to be locked, and with a hollow projection (2B) that extends from the main body (2A). Likewise, the lock in which the identifier assembly is installed comprises a knob (3) that is housed inside the hollow projection (2B) and extends below the main body (2A) and comprises at least one lower section with a knob ramp (3A).

The identifier assembly has a tongue (1) linked to the knob ramp (3A), such that when the knob (3) is actuated, preferably moving in the longitudinal direction of the hollow projection (2B), it causes the tongue (1) to move in a direction transverse to that of movement of the knob (3) (in a plane parallel to the main body (2A)) to lock or unlock the lock. Preferably, the tongue (1) comprises a nipple (1 B) arranged facing the knob ramp (3A) so that, when the knob (3) moves in the longitudinal direction of the hollow projection (2B), the knob ramp (3A) comes into contact with the nipple (1 B), thus causing the tongue (1) to move in a transverse direction to that of the movement of the knob (3).

The tongue (1) also comprises at least one inclined recess comprising at least one inclined surface forming a tongue ramp (1 A).

The identifier assembly also has an identification element (4) configured to be housed in the hollow projection (2B) and which comprises, at a lower end, at least one guide element (4A) configured to be housed in the inclined recess of the tongue (1) and movable through said recess on the tongue ramp (1 A) such that when the tongue (1) moves actuated by the movement of the knob (3), the identification element (4) moves in the longitudinal direction of the hollow projection (2B) between a first position in which it is hidden in said hollow projection (2B) and a second position in which it projects superiorly from an upper end of said hollow projection (2B).

Figure 2A:
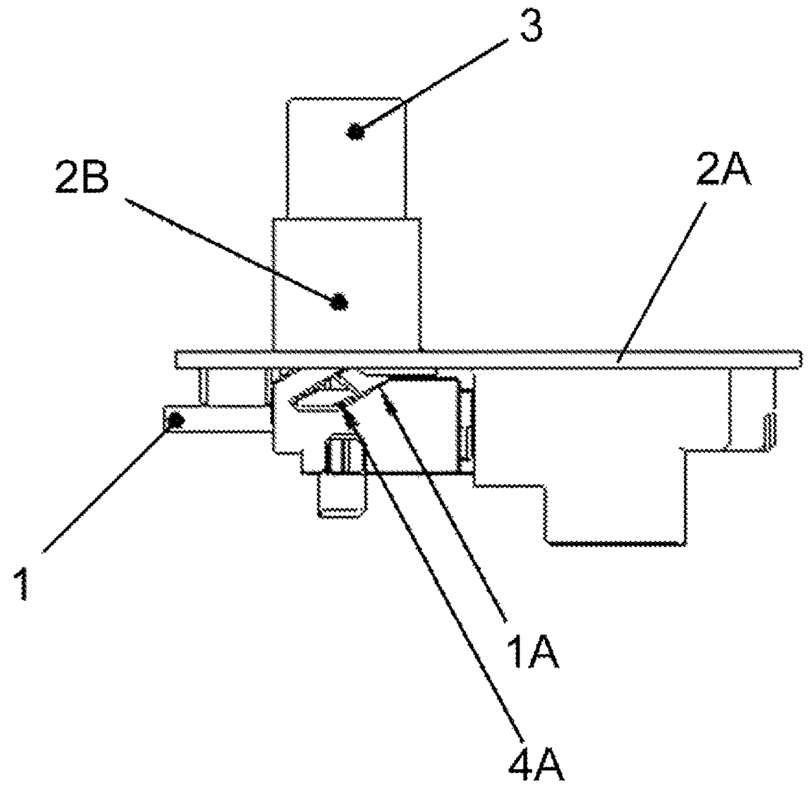
FIG. 2A shows a view of the identifier assembly wherein the identification element is in a first position, indicating that the lock is unlocked.

FIG. 2A shows the identifier assembly with the identification element (4) in the first position, meaning hidden inside the hollow projection (2B). This indicates that the lock is unlocked.

Figure 2B:
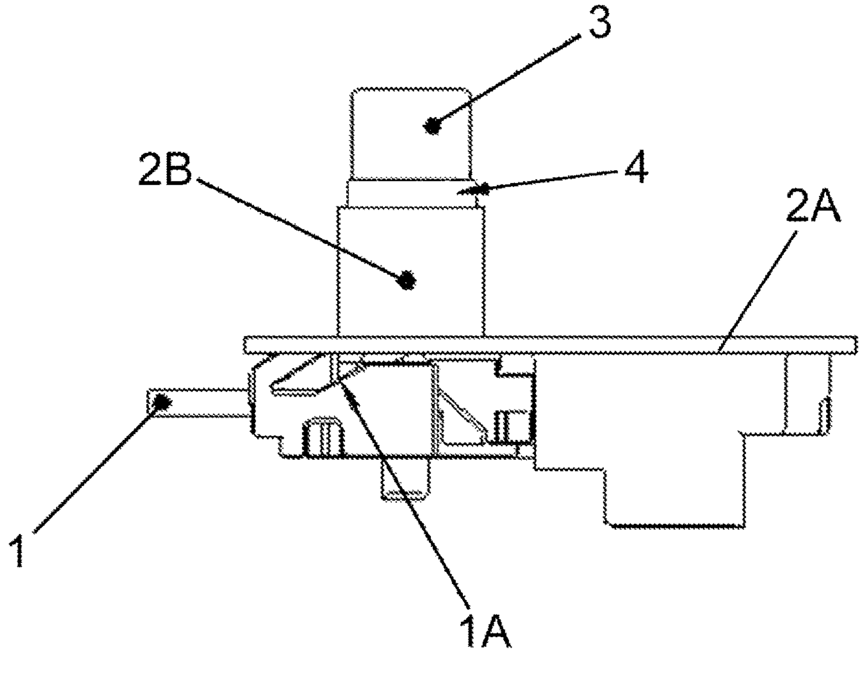
FIG. 2B shows a view of the identifier assembly wherein the identification element is in a second position, indicating that the lock is locked.

FIG. 2B shows the identifier assembly with the identification element (4) in the second position, meaning it is observed projecting above the hollow projection (2B).

In the examples shown in the figures, the knob (3), the hollow projection (2B) and the identification element (4) are cylindrical. In another embodiment, the knob (3), the hollow projection (2B) and the identification element (4) are prismatic. The bases of said prisms can be in the shape of a triangle, square, pentagon, etc. In the example of the figures, the identification element (4) is also hollow and is arranged around the knob (3), both being housed in the hollow projection (2B).

When the user wants to use the identifier device in an automatic mechatronic lock, they simply have to bring the identifier device closer to the reading area of the lock and, if the identification is correct, the lock locks, moving the tongue (1) out of the cover (2), moving to a locked position as seen in FIG. 2B.

In a preferred embodiment, the tongue (1) has two recesses and therefore comprises a double ramp (1A). When the tongue (1) moves, it moves the guide element (4A) comprised in the identification element (4) with it, causing said guide element (4A) of the identification element (4) to move on the ramp (1 A), said identification element (4) moving longitudinally through the hollow projection (2B) projecting from the upper end of said hollow projection (2B), as seen in the aforementioned FIG. 2B. When the tongue reaches the end of the locking path thereof, the identification element (4) is in the most external position, the highest with respect to the cover (2), in such a way that it is visible, thus indicating that the lock is locked.

When the lock is unlocked, the tongue (1) moves in the opposite direction being arranged below the main body (2A) and during said movement the identification element (4) moves following the ramp (1 A) by means of the guide element (4A), in this case following the decreasing inclination of said ramp. When said movement ends, the identification element (4) is already in the first position, hidden in the hollow projection (2B) of the cover (2), indicating that the lock is unlocked.

When the user wants to use the identifier device in a manual mechatronic lock, it is the user who performs the mechanical action of locking or unlocking the lock. When locking the lock, the tongue (1) moves outwards and, by means of the ramps (1 A) and the guide element (4A), the identification element (4) is moved, moving longitudinally towards the outside of the hollow projection (2B) of the cover (2). When the lock is unlocked, the elements move in the same way but in the opposite direction.

Likewise, when it is wanted to use the identification device in a mechanical lock, it is also the user who performs the mechanical actions of unlocking or locking the lock. In this case, the identifier assembly functions once again as in the previous cases, that is, when locking, the tongue (1) moves the identification element (4) outwards, where it is displayed. By means of the ramps (1 A) and the guide element (4A), the identification element (4) moves to the second position. For the unlocking, the same movements are carried out, but in the opposite direction and the identification element (4) moves towards the first position.

As previously described, in an embodiment the tongue (1) comprises two recesses, parallel to each other, forming two tongue ramps (1 A). In this case, the identification element (4) preferably comprises two guide elements (4A), each one of which is configured to house and move in one of the recesses of the tongue (1).

The figures show an embodiment wherein the hollow projection (2) and the identification element (4) are cylindrical and arranged concentric to one another. Likewise, in these embodiments the identification element (4) and the knob (3) are cylindrical, the identification element (4) is hollow, and they are arranged concentric to one another with the identification element (4) arranged around the knob (3). More preferably, the identification element (4) is arranged around the knob (3) and both are housed inside the hollow projection (2B), such that the three elements are concentric.

Figure 3A:
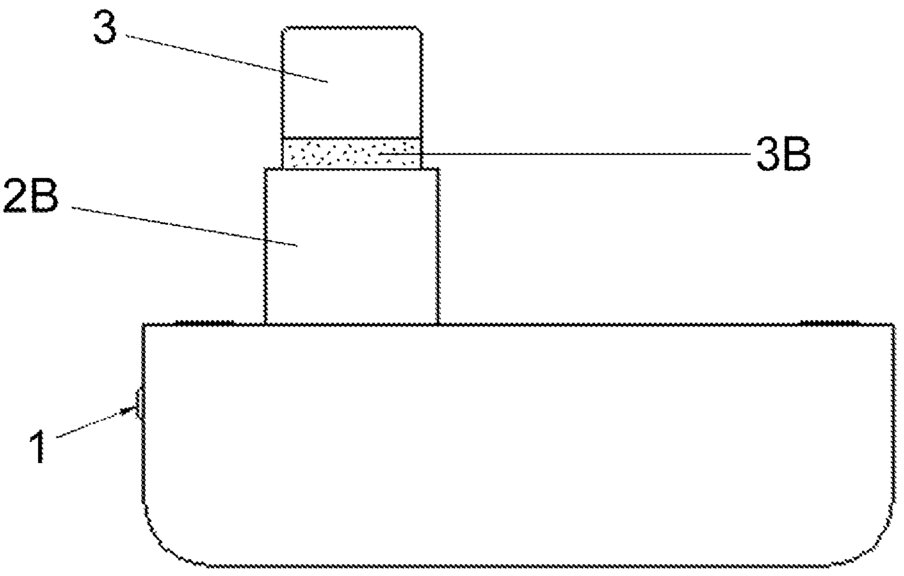
FIG. 3A shows a view of the identifier assembly in an embodiment wherein the knob comprises a knob signaling section and wherein the identification element is in the first position.

FIG. 3A shows an embodiment wherein the knob (3) comprises a knob signaling section (3B) flush with the upper end of the hollow projection (2B), such that when the identification element (4) is in the first position said knob signaling section is visible, and when the identification element (4) is in the second position, it is hidden by said identification element (4).

Figure 3B:
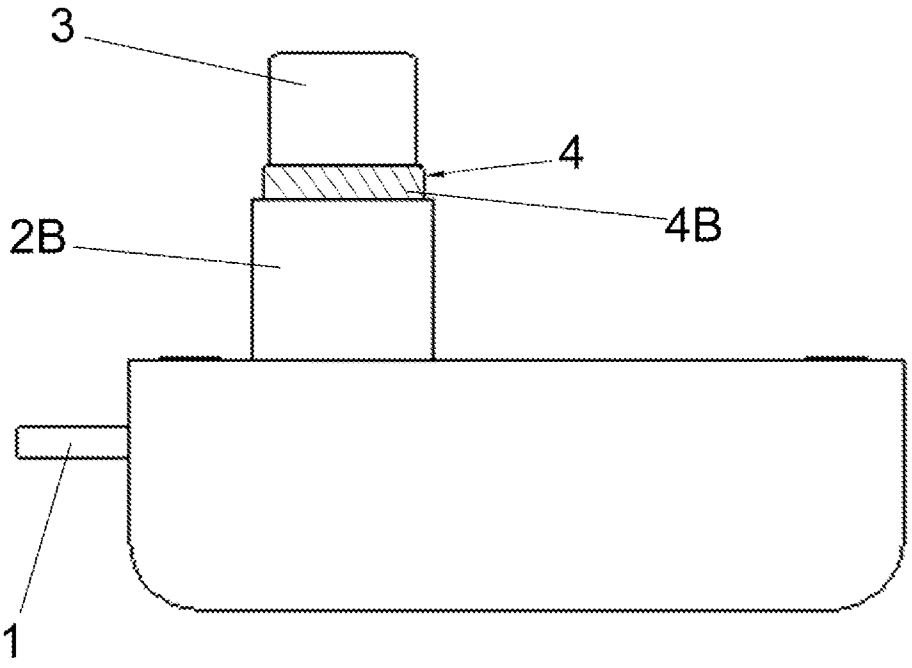
FIG. 3B shows a view of the identifier assembly in an embodiment in which the identification element comprises an identification element signaling section and said identification element is in the second position, such that the identification element signaling section is visible.

FIG. 3B shows an embodiment wherein the identification element (4) comprises at least one identification element signaling section (4B), arranged at the upper end thereof, which is visible when the identification element (4) is in the second position. In said FIG. 3B, the lock can be seen in the locked position and therefore the identification element (4) is in the second position and the identification signaling section (4B) can be seen by the user with the naked eye.

In another possible embodiment, both the knob (3) and the identification element (4) comprise signaling sections so that when the identification element (4) is in the first position, the user can see the knob signaling section (3B) and when the identification element (4) moves to the second position, the user can see the identification element signaling section (4B), which hides the knob signaling section (3B).

In another possible embodiment, the knob signaling section (3B) can have a greater length than the identification element signaling section (4B) so that when the identification element (4) is in the second position, both signaling sections can be seen.

The present invention should not be limited to the embodiment described herein. Other configurations may be carried out by those skilled in the art based on the present description. Accordingly, the scope of the invention is defined by the following claims.

The invention claimed is:

1. A lock identifier assembly configured to be used in lock types comprising:

a cover with a main body, configured to be installed in a door to be locked, and with a hollow projection that extends from the main body, and a knob which is housed inside the hollow projection and extends below the main body and comprises at least one lower section with a knob ramp;

and wherein the identifier assembly comprises:

a tongue linked to the knob ramp, such that when the knob is actuated, the knob ramp moves, moving said tongue with it to lock or unlock the lock, and wherein said tongue further comprises at least one recess comprising at least one inclined surface forming a tongue ramp;

an identification element configured to be housed in the hollow projection and which comprises, at a lower end, at least one guide element configured to be housed in the recess of the tongue and movable through said recess on the tongue ramp such that, when the tongue moves actuated by the movement of the knob, the identification element moves in the longitudinal direction of the hollow projection, such that when it is in a first position, it is hidden in said hollow projection, and when it is in a second position, it projects superiorly from an upper end of said hollow projection.

2. The identifier assembly of claim 1, wherein the tongue comprises two recesses, parallel to each other, forming two tongue ramps.

3. The identifier assembly of claim 2, wherein the identification element comprises two guide elements, each one of which is configured to be housed and moved in one of the recesses of the tongue.

4. The identifier assembly of claim 1, wherein the hollow projection and the identification element are cylindrical or prismatic and are arranged concentric to one another.

5. The identifier assembly of claim 1, wherein the identification element and the knob are cylindrical or prismatic, the identification element is hollow, and they are arranged concentric to one another with the identification element arranged around the knob.

6. The identifier assembly of claim 1, wherein the hollow projection and the identification element are cylindrical or prismatic and are arranged concentric to one another, the identification element and the knob are cylindrical or prismatic, the identification element is hollow, and they are arranged concentric to one another with the identification element arranged around the knob and both the identification element and the knob are housed inside the hollow projection such that the three elements are concentric.

7. The identifier assembly of claim 1, wherein the identification element comprises an identification element signaling section, arranged at the upper end thereof, which is visible when the identification element is in the second position and hidden when the identification element is in the first position.

8. The identifier assembly of claim 1, wherein the knob comprises a knob signaling section flush with the upper end of the hollow projection, such that when the identification element is in the first position, said knob signaling section is visible and when the identification element is in the second position, it is hidden by said identification element.

* * * * *